(12) United States Patent
Tragesser et al.

(10) Patent No.: US 8,069,707 B2
(45) Date of Patent: Dec. 6, 2011

(54) METHODS AND APPARATUS FOR DETERMINING MOMENT WEIGHT OF ROTATING MACHINE COMPONENTS

(75) Inventors: Daniel Tragesser, Simpsonville, SC (US); Patrick C. Bowling, Greenville, SC (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 12/536,148

(22) Filed: Aug. 5, 2009

(65) Prior Publication Data

US 2011/0030459 A1 Feb. 10, 2011

(51) Int. Cl.
*G01M 1/00* (2006.01)
(52) U.S. Cl. .................................. 73/65.01; 73/112.01
(58) Field of Classification Search .................. 73/65.01, 73/112.01, 168
See application file for complete search history.

(56) References Cited

U.S. PATENT DOCUMENTS

| | | | |
|---|---|---|---|
| 4,602,412 A | | 7/1986 | Partington et al. |
| 4,767,272 A | | 8/1988 | Kildea |
| 5,087,097 A | * | 2/1992 | Hehn ............................ 297/153 |
| 5,177,847 A | * | 1/1993 | Ottone ........................ 29/243.56 |
| 5,367,129 A | | 11/1994 | Lahl, Jr. |
| 5,470,590 A | * | 11/1995 | Brubaker et al. ................. 425/2 |
| 5,474,271 A | * | 12/1995 | Raymond ...................... 248/237 |
| 6,173,564 B1 | * | 1/2001 | Zachary ...................... 60/39.091 |
| 6,908,285 B2 | | 6/2005 | Henning et al. |
| 7,207,775 B2 | | 4/2007 | Muriithi |
| 2009/0035138 A1 | | 2/2009 | Harrison et al. |
| 2010/0316496 A1 | * | 12/2010 | Williams et al. .............. 416/144 |

OTHER PUBLICATIONS

"Orenda Turbines, (Ordenda Turbines, Repair, Overhaul & Industrial) Divsion of Magellan . . . Best Practice: Moment Weight Measurement System", http://www.bmpcoe.org/bestpractices/internal/ortur/ortur_3.html, Best Manufacturing Practices Center of Excellence, Best Practices Surveys: Survey Reports, 2 pages, Jun. 15, 2009.

"Moment Weight Scales for Turbine Blade Balance", http://www.space-electronics.com/Products/moment_weight_scales.php, Space Electronics LLC, 3 pages, Jun. 15, 2009.

"Moment Weight Scales Basic Machine Operating Concept", http://www.space-electronics.com/Products/MWOperatingConcept.php, Space Electronics LLC, 2 pages, Jun. 15, 2009.

K.J. Pallos, "Gas Turbine Repair Technology", GE Power Systems, GER-3957B, Apr. 2001, 26 pages, GE Energy Services Technology, Atlanta, GA.

* cited by examiner

*Primary Examiner* — Max Noori
(74) *Attorney, Agent, or Firm* — Nixon & Vanderhye, P.C.

(57) ABSTRACT

A method of determining the moment weight of a rotating component for a rotary machine includes the steps of: (a) supporting the component on a platform at a pair of spaced locations along a length dimension of the component, one of the spaced locations corresponding to a known radial distance from a centerline of a rotor of the rotary machine to a predetermined location on the component when the component is installed on the rotary machine, and wherein a center of gravity of the component is located between the spaced locations; (b) determining partial weights of the rotary machine component by supporting the platform on a pair of weight scales vertically aligned with and substantially centered on the spaced locations, wherein a total weight TW of the component is equal to a sum of the partial weights; (c) utilizing information obtained in step (b), locating a center of gravity of the component relative to the one of the spaced locations and determining a radial distance D1 between the center of gravity and the centerline of the rotor; and (d) utilizing information obtained in steps (a)-(c), determining the moment weight of the component by an equation: $MW=TW*D1$.

20 Claims, 3 Drawing Sheets

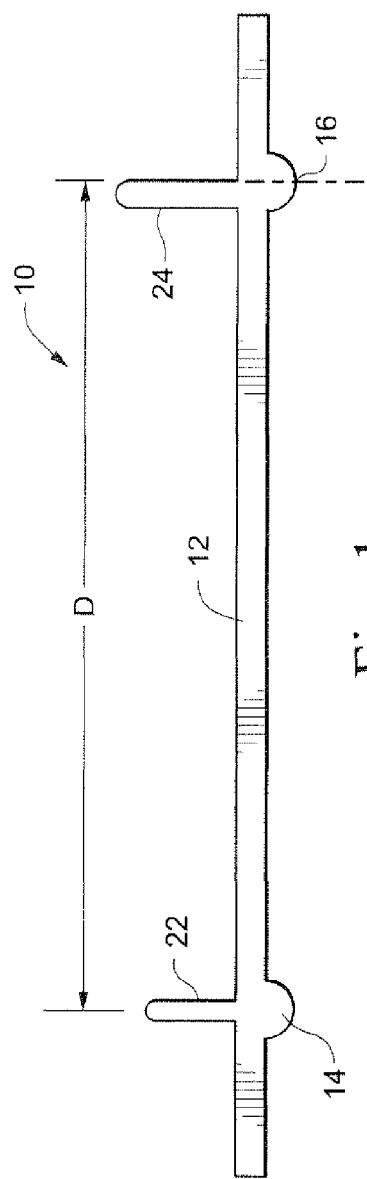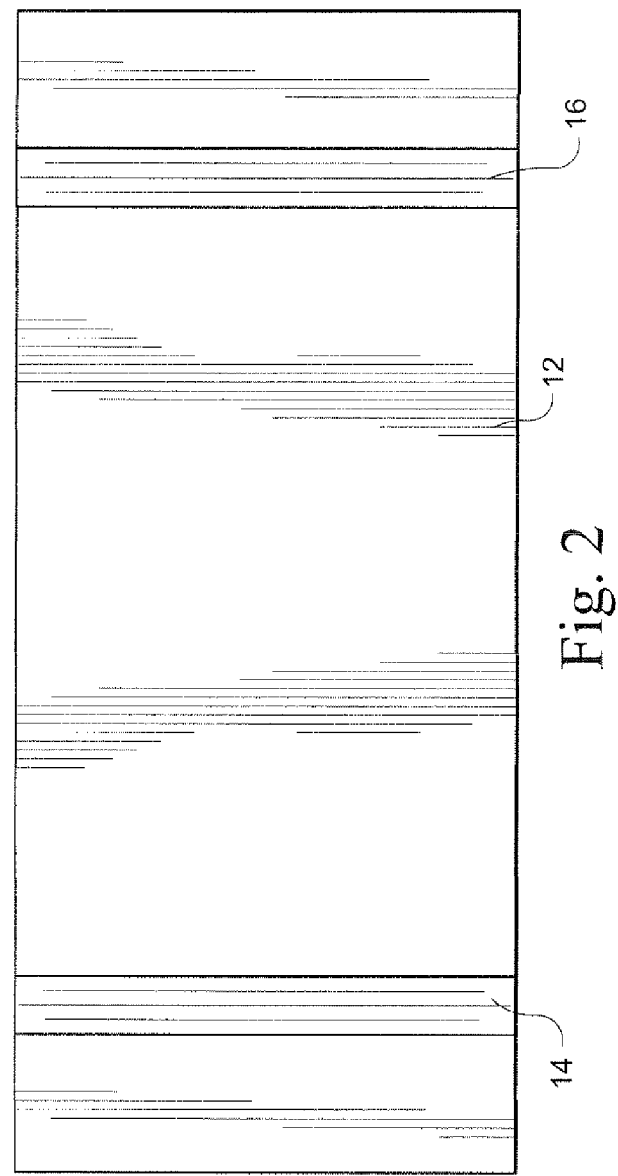

METHODS AND APPARATUS FOR DETERMINING MOMENT WEIGHT OF ROTATING MACHINE COMPONENTS

BACKGROUND OF THE INVENTION

This invention relates generally to turbine engines and, more particularly, to a portable tool for determining the moment weight of rotating machine components such as turbine buckets.

At least some known gas turbine engines include a core engine having, in serial flow arrangement, a fan assembly and a high pressure compressor which compress airflow entering the engine. A combustor ignites a fuel-air mixture which is then channeled through a turbine nozzle assembly towards low and high pressure turbines which each include a plurality of rotor blades that extract rotational energy from airflow exiting the combustor. Gas turbines are used in different operating environments to provide, for example, propulsion for aircraft and/or to produce power in land-based power generation systems.

During normal operation, gas turbine engines may experience high rotational speeds. An imbalance of the rotor may cause vibration of the rotor and induce stresses in the rotor bearings and support structures. Over time, continued operation with such stresses may lead to failure of the bearings, bearing support structure(s) and/or other rotor components. Failure of a component within the engine system may damage the system and/or other components within the system, and may require system operations be suspended while the failed component is replaced or repaired. More particularly, when the component is a turbofan gas turbine engine fan blade, a blade-out condition may also cause damage to one or more blades downstream from the released blade.

To facilitate minimizing imbalance of the disk or wheel during operation, the blades or buckets are assembled in a controlled manner. For example, one control that may be used in assembling buckets to rotors includes determining the moment weight of each bucket and using that information to map each bucket into specific wheel slots.

Currently, fairly complex moment weight scales are available, but there appears to be no present option for a customer to perform these measurements on site due to the size, cost and complexity of the equipment. There remains a need, therefore, for a relatively simple, inexpensive and portable moment weight tool that a customer can use on site.

BRIEF DESCRIPTION OF THE INVENTION

In accordance with an exemplary but nonlimiting embodiment, the invention relates to a substantially rigid, planar platform having an upper side provided with a pair of transverse component-supporting posts, and a lower side provided with a pair of transverse foot rails adapted to engage a respective pair of weight scales; wherein a first centerline of one of the pair of transverse component-supporting posts is coincident with a first centerline of one of the pair of transverse foot rails, and a second centerline of the other of the pair of transverse component-supporting posts is offset from but parallel to a second centerline of the other of the pair of transverse foot rails.

In accordance with another exemplary but non limiting embodiment, the invention relates to a substantially rigid, planar platform having an upper side provided with a pair of component-supporting posts, and a lower side provided with a pair of foot rails seated on a respective pair of weight scales; and a turbine bucket adapted for installation on a wheel of a turbine rotor supported on the pair of component-supporting posts, the component-supporting posts located such that a center of gravity of the turbine bucket is located between the component-supporting posts, and a radially inward one of the component-support posts is engaged with a fir tree portion of the turbine bucket at a reference location that, when the turbine bucket is installed on the wheel of the turbine rotor, is a known distance from a centerline of the turbine rotor.

In still another aspect, the invention relates to the method of determining the moment weight of a rotating component for a rotary machine comprising, (a) supporting the component on a platform at a pair of spaced locations along a length dimension of the component, one of the spaced locations corresponding to a known radial distance from a centerline of a rotor of the rotary machine to a predetermined location on the component when the component is installed on the rotary machine, and wherein a center of gravity of the component is located between the spaced locations; (b) determining partial weights of the rotary machine component by supporting the platform on a pair of weight scales vertically aligned with and substantially centered on the spaced locations, wherein a total weight TW of the component is equal to a sum of the partial weights; (c) utilizing information obtained in step (b), locating a center of gravity of the component relative to the one of the spaced locations and determining a radial distance D1 between the center of gravity and the centerline of the rotor; and (d) utilizing information obtained in steps (a)-(c), determining the moment weight of the component by an equation: $MW=TW*D1$.

The invention will now be described in connection with the drawings identified below.

BRIEF DESCRIPTION OF THE DRAWINGS

FIG. 1 is a schematic side illustration of a moment weight platform in accordance with an exemplary but non-limiting embodiment of the invention;

FIG. 2 is a bottom plan view of the moment weight platform shown in FIG. 1;

DETAILED DESCRIPTION OF THE INVENTION

FIG. 1 illustrates an exemplary but non-limiting embodiment of a moment-weight tool 10 that may be used to obtain the information necessary to calculate the moment-weight of buckets used in multiple turbine stages of a particular turbine engine frame size. The tool 10 includes a horizontally-oriented, substantially planar and rigid platform 12 provided with a pair of transverse foot rails 14, 16 on the lower side of the platform 12. As will be explained further below, the foot rails support the tool 10 on a pair of scales 18, 20 (FIG. 3) when in use.

Figure 3:
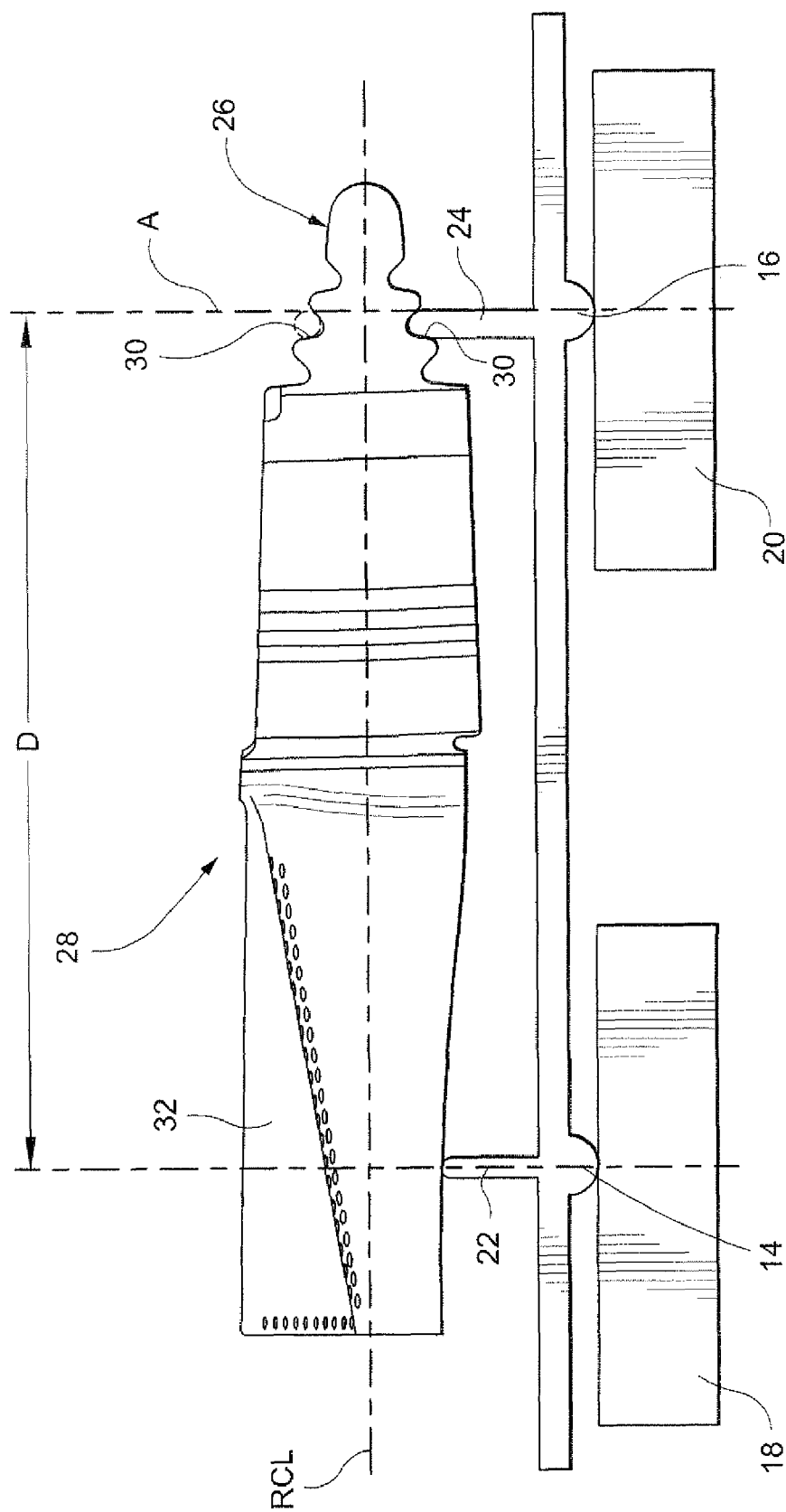
FIG. 3 is a schematic side elevation of the moment weight platform of FIG. 1, in use, with the platform supported on a pair of scales, and with a turbine bucket supported on the platform.

Transverse component-supporting posts 22, 24 are provided on the upper side of the platform 10 in substantial vertical alignment with the foot rails 14, 16. For convenience, the post 24 will be referred to as the reference post and the post 22 will be referred to as the airfoil post. In a more generic sense, the posts 22 and 24 may be referred to as the radially inner and outer posts, respectively, as explained further herein. The centerline of the airfoil post 22 is coincident with the centerline of the foot rail 14. The reference post 24, however, is offset from the centerline of the foot rail 16 in this example. More specifically, the reference post 24 is located so as to engage the so-called fir tree portion 26 of a selected bucket 28 (FIG. 3) adjacent an arbitrarily chosen reference plane A. In this example, the location of the reference plane A is determined by measurement from the bottom of a pair of pins (one shown in phantom in FIG. 3) located in fir tree grooves 30 (thus simulating a mating male projection of a complimentary fir tree groove in the turbine disk or wheel) to the centerline of the turbine rotor. In other words, the location of the reference plane A represents a known radial distance from the machine rotor centerline to a predetermined reference location on the bucket. As shown in FIG. 3, the reference plane A is aligned with the outboard side of the reference post 24 and with the centerline of the foot rail 16. It will be understood, however, that the location of the reference plane A relative to the post 24 may vary depending, for example, on which fir tree groove is engaged by the post. As a practical matter, the reference plane A could extend along either side or through the center of the reference post 24.

In the exemplary embodiment, the centerline of the airfoil post 22 is located a radial distance D from the reference plane A. "Radial" here is used in the context of a bucket as normally oriented relative to a turbine wheel, hence the characterization of airfoil post 22 as a radially outward post and reference post 24 as a radially inward post. In addition, the location of the airfoil post 22 relative to the reference post 24, and height of the airfoil post 22 are adjusted to have the radial centerline RCL of the bucket 28 be substantially parallel to the platform 12. In addition, the Center of Gravity (COG) of the bucket 28 must be located between the airfoil post 22 and the reference post 24, and of course, the airfoil post must be radially inward of the tip of the airfoil portion 32 of the bucket 28. In other words, the distance D must be long enough so that the COG is located between the airfoil post 22 and the reference post 24, but short enough that the airfoil post 22 lies within the airfoil portion 32 of the bucket 28.

For a tool 10 designed to accommodate a specific turbine frame size, the reference post 24 and the airfoil post 22 may remain at the same relative locations along the platform, but the height of the airfoil post 22 may require adjustment (by, for example, replacing the airfoil post) for buckets in different stages (within the same turbine frame size) to achieve the desired parallel orientation of the bucket RCL to the platform 12.

In one exemplary embodiment, the upper end or tip of the reference post 24 is machined or otherwise formed to have a radius of about 0.30 inch which then also defines the width of the post. The height of the reference post 24 to the start of the radius curve may be about 1.33 inches. The airfoil post 22 may have a tip radius and post width of about 0.25 inch, and a height to the start of the radius curve of about 1.02 inches. Note that the reference post 24 is offset from the underlying foot rail 16 so that the reference plane A (FIG. 3) that extends along one side of the reference post 24, passes through the center of the foot rail 16.

With continuing reference to FIG. 3, in use the platform 12 is placed on the pair of identical weight scales 18, 20 each centered below respective foot rails 14, 16. The bucket 28 is supported on the airfoil post 22 and the reference post 24 as described above, with a distance D of 10 inches for the exemplary embodiment. Given the set-up as shown in FIG. 3, the moment weight MW of the bucket 28 can be determined as follows. The Moment Weight (MW) for a rotating component (such as the turbine bucket 28) is equal to the weight W of the component multiplied by the distance D1 from the component's COG to the centerline of the turbine rotor. The reference plane A is located a known radial distance D2 from the rotor centerline, and it is therefore necessary to locate the component's COG and the distance D3 between the COG and the reference plane A. The distance D1 can then be determined by adding D2 and D3. The total weight TW of the component is simply the sum of the weights measured at the airfoil scale 18 and the reference plane scale 20. The bucket COG with respect to the reference plane A is then equal to: (Airfoil Scale weight*D)/(Airfoil Scale weight+Reference Scale weight). The Moment Weight MW of the bucket 28 is therefore equal to TW*(D2+D3), or TW*D1.

Figure 4:
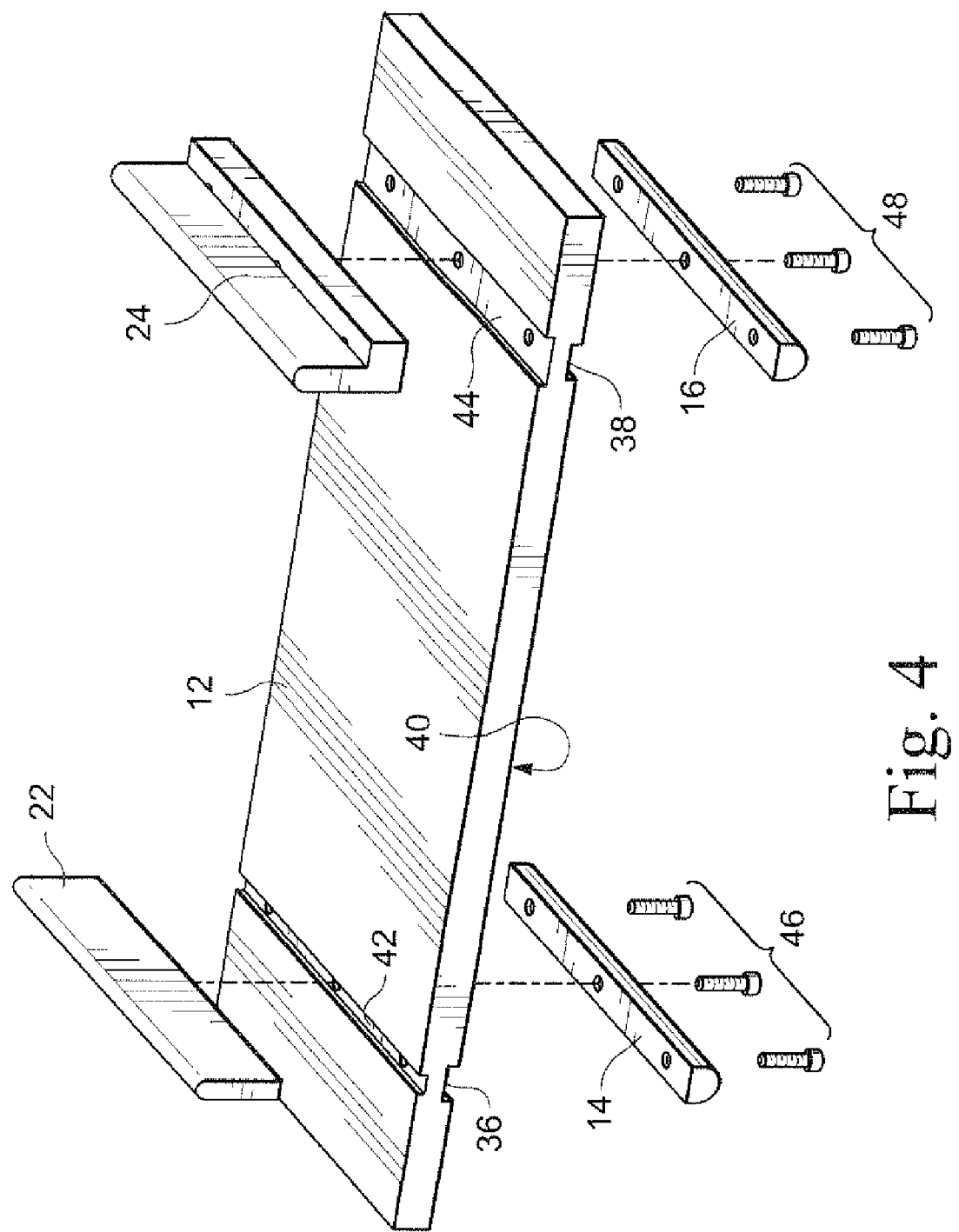
FIG. 4 is an exploded assembly view of an exemplary but nonlimiting implementation of the moment weight platform illustrated in FIGS. 1 and 2.

FIG. 4 illustrates a practical implementation of the above-described tool, showing how the foot rails 14, 16, airfoil post 22 and reference post 24 can be attached to the platform 12. More specifically, the platform 12 is formed to include lower transverse slots or grooves 36, 38 on the platform underside 40 which receive the foot rails 16, 18, and upper transverse grooves or slots 42, 44 which receive the airfoil post 22 and reference post 24, respectively. Note the L-shaped configuration of the reference post 24 which enables the reference plane A to align with the outboard side surface of the reference post 24, offset from the centerline of the underlying foot rail 18 as explained above, while nevertheless keeping the slots or grooves 38, 44 in vertical alignment.

Three cap screws 46 are utilized to secure the foot rail 14 and airfoil post 22 to the platform 12, and similarly, three cap screws 48 are utilized to secure the foot rail 16 and reference post 24 to the platform. This is an assembly feature made possible by the vertical alignment of slot or groove pairs 42, 36 and 44, 38.

For a different turbine frame size, both the airfoil post 22 and the reference post 24 would be changed, with the shapes and heights of the posts and the distance between the posts adjusted as needed. Thus, for a different turbine frame size, it is most practical to simply provide a new tool platform and related foot rails and support posts, sized and arranged as necessary to accommodate components associated with the new frame size.

It will also be appreciated that while the invention has been described and illustrated with respect to determining the Moment Weight of a turbine bucket, the tool 10 may be used to determine the moment weight of any rotating machine component, with appropriate adjustments to the shape, height and location of the component supporting rails/posts.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moment weight tool comprising:
 a substantially rigid, planar platform having an upper side provided with a pair of transverse component-supporting posts, and a lower side provided with a pair of transverse foot rails adapted to engage a respective pair of weight scales;
 wherein a first centerline of one of said pair of transverse component-supporting posts is coincident with a first centerline of one of said pair of transverse foot rails, and a second centerline of the other of said pair of transverse component-supporting posts is offset from but parallel to a second centerline of the other of said pair of transverse foot rails.

2. The moment weight tool of claim 1 wherein the second centerline of the other of said pair of transverse foot rails runs along a side surface of said other of the pair of transverse component-supporting posts.

3. The moment weight tool of claim 1 wherein said one of said pair of transverse component-supporting posts has a height lower than said other of said pair of transverse component-supporting posts.

4. The moment weight tool of claim 1 wherein said upper side of said platform is formed with a first pair of transverse grooves, and said pair of transverse component-supporting posts is received, respectively, in said first pair of transverse grooves.

5. The moment weight tool of claim 1 wherein said lower side of said platform is formed with a second pair of transverse grooves, and said pair of transverse foot rails is received, respectively, in said second pair of transverse grooves.

6. The moment weight tool of claim 1 wherein tips of each of said pair of transverse component-supporting posts is radiused.

7. The moment weight tool of claim 1 including a pair of weight scales adapted to be engaged, respectively, by said pair of transverse foot rails.

8. The moment weight tool of claim 4 wherein said first and second pairs of transverse grooves are substantially vertically aligned.

9. A moment weight apparatus and a turbine bucket supported on the moment weight apparatus comprising:
a substantially rigid, planar platform having an upper side provided with a pair of component-supporting posts, and a lower side provided with a pair of foot rails seated on a respective pair of weight scales; and
a turbine bucket adapted for installation on a wheel of a turbine rotor supported on said pair of component-supporting posts, said component-supporting posts located such that a center of gravity of the turbine bucket is located between said component-supporting posts, and a radially inward one of said component-support posts is engaged with a fir tree portion of the turbine bucket at a reference location that, when the turbine bucket is installed on the wheel of the turbine rotor, is a known distance from a centerline of the turbine rotor.

10. The apparatus and turbine bucket of claim 9 wherein a radially outward one of said pair of component-supporting posts is engaged with an airfoil portion of the turbine bucket.

11. The apparatus and turbine bucket of claim 10 wherein height dimensions of said pair of component-supporting posts and a distance between centerlines of said pair of component-supporting posts are calculated to orient a radial center line of said turbine bucket substantially parallel to said platform.

12. The apparatus and turbine bucket of claim 9 wherein a first centerline of one of said pair of component-supporting posts is coincident with a first centerline of one of said pair of foot rails, and a second centerline of the other of said pair of component-supporting posts is offset from but parallel to a second centerline of the other of said pair of foot rails.

13. The apparatus and turbine bucket of claim 12 wherein said second centerline of said other of said pair of foot rails runs along a side surface of said other of said pair of component-supporting posts.

14. The apparatus and turbine bucket of claim 10 wherein said radially outward post has a height lower than said radially inward post.

15. The apparatus and turbine bucket of claim 9 wherein said upper side of said platform is formed with a first pair of grooves, and said pair of component-supporting posts is received, respectively, in said first pair of grooves.

16. The apparatus and turbine bucket of claim 15 wherein said lower side of said platform is formed with a second pair of grooves, and said pair of foot rails is received, respectively, in said second pair of grooves, said first and second pairs of grooves, respectively, being in substantial vertical alignment.

17. The apparatus and turbine bucket of claim 9 wherein said radially inward component-supporting post is substantially L-shaped.

18. The method of determining the moment weight of a rotating component for a rotary machine comprising:
(a) supporting the component on a platform at a pair of spaced locations along a length dimension of the component, one of said spaced locations corresponding to a known radial distance from a centerline of a rotor of the rotary machine to a predetermined location on the component when the component is installed on the rotary machine, and wherein a center of gravity of the component is located between said spaced locations;
(b) determining partial weights of the rotary machine component by supporting said platform on a pair of weight scales vertically aligned with and substantially centered on said spaced locations, wherein a total weight TW of the component is equal to a sum of the partial weights;
(c) utilizing information obtained in step (b), locating a center of gravity of the component relative to said one of said spaced locations and determining a radial distance D1 between the center of gravity and the centerline of the rotor; and
(d) utilizing information obtained in steps (a)-(c), determining the moment weight of the component by an equation: MW=TW*D1.

19. The method of claim 18 wherein said component comprises a turbine bucket.

20. The method of claim 18 wherein, in step (a), said turbine bucket is supported such that a radial centerline of said turbine bucket is substantially parallel with said platform.

* * * * *